J. G. LOCKWOOD.
Improvement in Horse Hay Rakes.

No. 122,039.  Patented Dec. 19, 1871.

UNITED STATES PATENT OFFICE.

J. GEORGE LOCKWOOD, OF WEST DAVENPORT, NEW YORK.

IMPROVEMENT IN HORSE HAY-RAKES.

Specification forming part of Letters Patent No. 122,039, dated December 19, 1871.

*To all whom it may concern:*

Be it known that I, J. GEORGE LOCKWOOD, of West Davenport, in the county of Delaware and State of New York, have invented a certain Improvement in Horse Hay-Rakes; and I do hereby declare that the following is a full, clear, and exact description thereof, which will enable others skilled in the art to make and use the same, reference being had to the accompanying drawing forming a part of this specification, in which—

Figure 1:
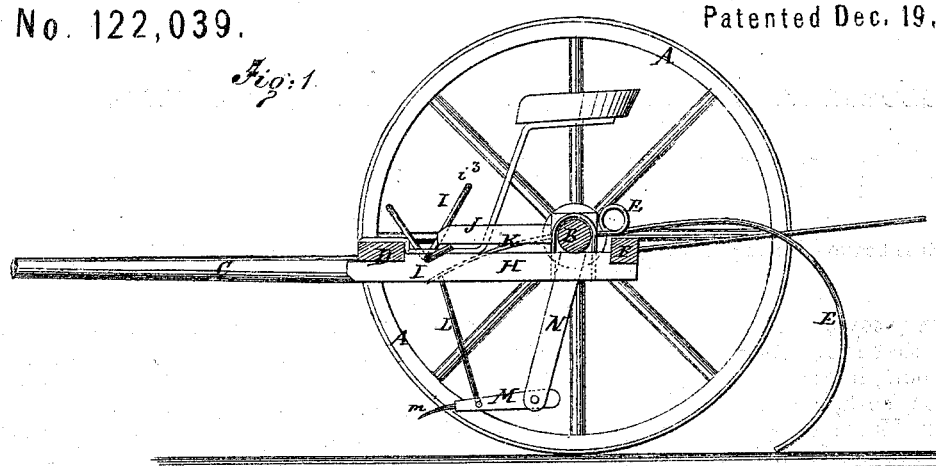
Figure 2:
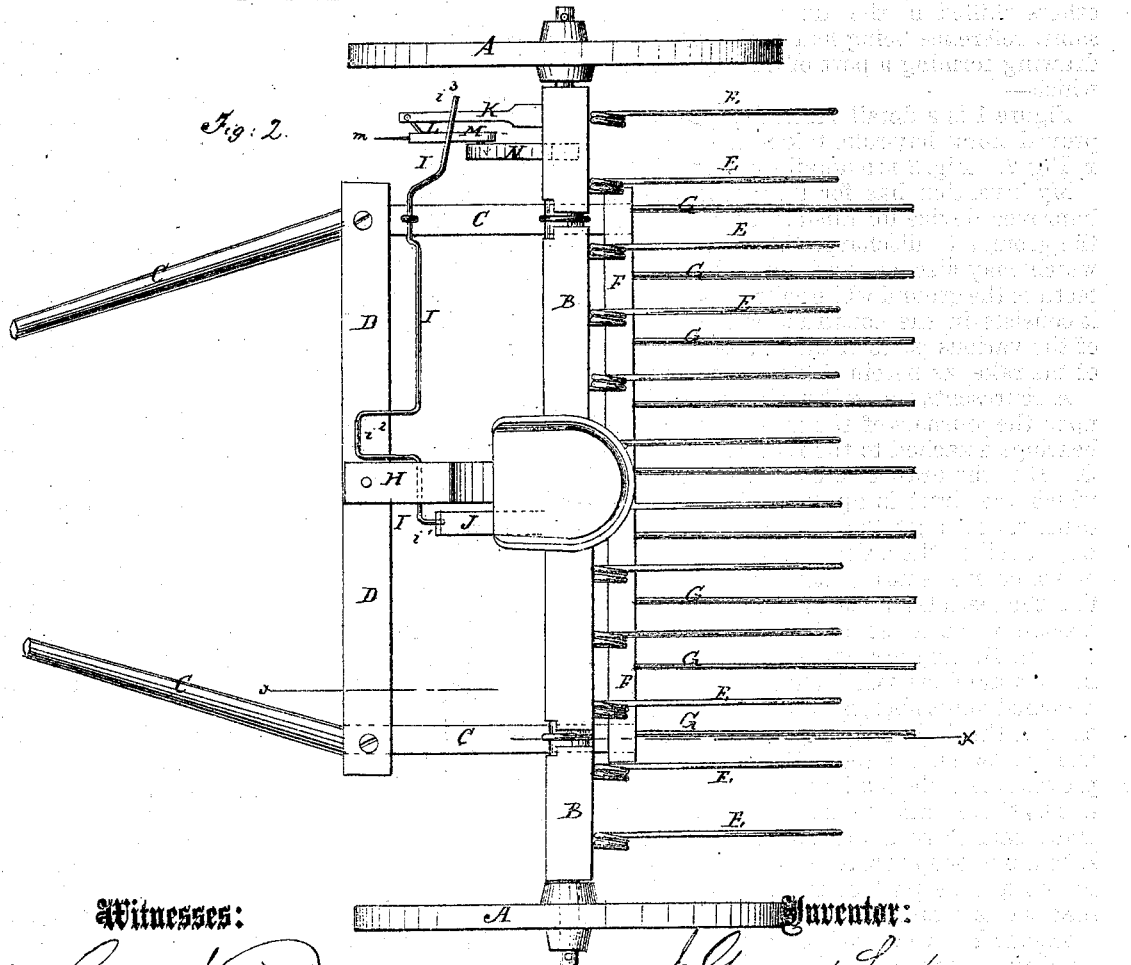

Figure 1 is a detail vertical section of my improved horse hay-rake taken through the line $x$ $x$, Fig. 2. Fig. 2 is a detail top view of the same.

My invention has for its object to furnish an improved device for raising the rake-teeth from the ground to discharge the collected hay, and which may also be used for holding the rake-teeth to the ground while collecting the hay; and it consists in the construction and combination of the various parts of the device with the parts of the rake, as hereinafter more fully described.

A represents the sulky-wheels which revolve upon the journals of the axle B, which works in bearings attached to the rear part of the shafts C. D is the draw or cross-bar of the shafts, to which the draft is applied. E are the curved teeth that collect the hay, and which are made with a coil in the ordinary manner, and the ends of which are securely attached to the axle B, so that the teeth E may be raised from the ground to discharge the collected hay by partially turning the axle B. To the rear ends of the shafts C, just in the rear of the axle B and below the teeth E, is attached a cross-bar, F, to which are attached the ends of the fingers G, which project to the rearward between the teeth E, and are designed to prevent the collected hay from being raised with and by the teeth E, and insure its being discharged when said teeth E are raised from the ground. H is a bar, the forward end of which is attached to the middle part of the draw-bar D, and its rear end is attached to the middle part of the cross-bar F. I is a rod or shaft, which works in bearings attached to the shaft C and bar H. The inner end $i$ of the rod I is bent at right angles to rest against the lower side of the forward end of the arm J, the rear end of which is rigidly attached to the axle B. The bar I upon the other side of the bar H is bent four times at right angles to form a crank, $i^2$, to receive the driver's foot to enable him to operate the rod I. The outer end of the rod I is bent twice at an obtuse angle, as shown in Fig. 1, to form a crank, $i^3$, which projects above the spring K. The rear end of the spring K is rigidly attached to the axle B, and to its forward end is attached the upper end of the rod L, the lower end of which is pivoted to the middle part of the bar M. One end of the bar M has a point or prong, $m'$, formed upon or attached to it, and its other end is pivoted to the side of the lower end of the arm or bar N, rigidly attached to the under side of the axle B.

With this construction, the driver, by pressing the crank $i^2$ of the rod I forward with his foot, forces the crank-arm $i^1$ of said rod up against the end of the arm J, and thus holds the rake-teeth down to the ground. By pressing the crank $i^2$ to the rearward with his foot he forces the crank-arm $i^3$ down upon the spring K, pressing said spring downward and allowing the pivoted bar M to drop by its own weight, bringing the point or prong $m'$ in contact with the ground. This raises the rake-teeth from the ground as the machine is drawn forward and discharges the collected hay. As the rake-teeth drop back to the ground the spring K revolves the arm M back to its former position, ready to be again lowered to again discharge the collected hay.

Having thus described my invention, I claim as new and desire to secure by Letters Patent—

The crank-rod I $i^1$ $i^2$ $i^3$, rigid arm J, spring K, connecting-rod L, pivoted bar M $m$, and rigid bar N, in combination with the axle and shafts or frame of the rake, substantially as herein shown and described, and for the purpose set forth.

J. GEORGE LOCKWOOD.

Witnesses:
A. DEWAINE FERO,
SCHUYLER MARTIN.